US009400636B2

(12) United States Patent
Meyer (10) Patent No.: US 9,400,636 B2
(45) Date of Patent: Jul. 26, 2016

(54) APPARATUS AND METHOD FOR CALCULATING A RESULT IN A SCALAR MULTIPLICATION

(75) Inventor: Bernd Meyer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 701 days.

(21) Appl. No.: 13/025,221

(22) Filed: Feb. 11, 2011

(65) Prior Publication Data

US 2012/0207298 A1 Aug. 16, 2012

(51) Int. Cl.
  *G06F 21/00* (2013.01)
  *G06F 7/72* (2006.01)
  *H04L 9/00* (2006.01)
  *H04L 9/30* (2006.01)

(52) U.S. Cl.
  CPC ............... *G06F 7/725* (2013.01); *H04L 9/003* (2013.01); *H04L 9/3066* (2013.01); *G06F 2207/7223* (2013.01); *H04L 2209/08* (2013.01)

(58) Field of Classification Search
  USPC ................. 380/28, 30; 708/200, 208, 250
  See application file for complete search history.

(56) References Cited

U.S. PATENT DOCUMENTS

| | | | | |
|---|---|---|---|---|
| 7,308,096 B2* | 12/2007 | Okeya | ........ | G06F 7/725 380/28 |
| 7,835,517 B2 | 11/2010 | Akishita et al. | | |
| 8,243,919 B2* | 8/2012 | Ebeid | ........ | G06F 7/725 380/28 |
| 8,379,842 B2* | 2/2013 | Vasyltsov | ........ | G06F 7/725 380/2 |
| 8,411,855 B1* | 4/2013 | Robinson | ........ | G06F 7/725 380/28 |
| 8,442,216 B2* | 5/2013 | Lambert | ........ | G06F 7/725 380/28 |
| 8,498,411 B1* | 7/2013 | Parkinson et al. | ........ | 380/30 |
| 2003/0059042 A1 | 3/2003 | Okeya et al. | | |

(Continued)

FOREIGN PATENT DOCUMENTS

CN  101005350 A  7/2007
FR  2942560 A1   8/2010

(Continued)

OTHER PUBLICATIONS

Oswald, E. at al. "Randomized Addition-Subtraction Chains as a Countermeasure against Power Attacks." Cryptographic Hardware and Embedded Systems—CHES 2001, Proceedings of the Third International Workshop. Springer, Paris. May 14-16, 2001. pp. 39-50.

(Continued)

*Primary Examiner* — Harris C Wang
(74) *Attorney, Agent, or Firm* — Murphy, Bilak & Homiller, PLLC (57) ABSTRACT

An apparatus for calculating a result of a scalar multiplication of a reference number with a reference point on an elliptic curve includes a random number generator and processor. The random number generator generates a random bit. The processor calculates the result of the scalar multiplication based on a calculation algorithm using a first auxiliary variable storing a first interim result representing an integer multiple of the reference point or a coordinate of an integer multiple of the reference point and a second auxiliary variable storing a second interim result representing another integer multiple of the reference point or a coordinate of another integer multiple of the reference point. The processor swaps a value stored by the first auxiliary variable and a value stored by the second auxiliary variable during calculation of the result of the scalar multiplication, if a swap condition depending on the generated random bit is fulfilled.

22 Claims, 3 Drawing Sheets

(56) References Cited

U.S. PATENT DOCUMENTS

| | | | |
|---|---|---|---|
| 2003/0123656 A1* | 7/2003 | Izu et al. | 380/30 |
| 2007/0211894 A1 | 9/2007 | Akishita et al. | |
| 2008/0025498 A1* | 1/2008 | Vasyltsov | G06F 7/725 380/28 |
| 2008/0205639 A1* | 8/2008 | Braun | G06F 7/723 380/30 |
| 2008/0219437 A1 | 9/2008 | Ebeid | |
| 2010/0172490 A1 | 7/2010 | Braun et al. | |
| 2011/0213982 A1* | 9/2011 | Brown | H04L 9/3066 713/176 |
| 2011/0216900 A1* | 9/2011 | Yoon | H04L 9/28 380/28 |
| 2012/0207298 A1* | 8/2012 | Meyer | G06F 7/725 380/28 |

FOREIGN PATENT DOCUMENTS

| | | |
|---|---|---|
| WO | 0042484 A2 | 7/2000 |
| WO | 2007028669 A1 | 3/2007 |
| WO | 2007112791 A1 | 10/2007 |

OTHER PUBLICATIONS

Kocher, "Timing Attacks on Implementations of Diffie-Hellman, RSA, DSS, and Other Systems", CRYPTO 96, LNCS 119, pp. 104-113, Springer-Verlag 1996.

Kocher, "Differential Power Analysis", CRYPTO 1999, LNCS 1666, pp. 388-397, Springer-Verlag1999.

Messerges, et al., "Power Analysis of Modular Exponentiation in Smartcards", CHES 1999 LNCS 1717, pp. 144-147, Springer-Verlag 1999.

Coron, "Resistance against Differential Power Analysis for Elliptic Curve Cryptosystems", CHES 1999, LNCS 1717, pp. 292-302, Springer-Verlag 1999.

Biehl, et al., "Differential Fault Attacks on Elliptic Curve Cryptosystems", CRYPTO 2000, LNCS 18880, pp. 131-146, Springer-Verlag 2000.

Boneh, et al., On the Importance of Checking Cyrptographic Protocols for Faults, Eurocrypt 97, LNCS 1233, pp. 37-51, Springer Verlag.

Montgomery, "Speeding the Pollard and Elliptic Curve Methods of Factorization", Mathematics of Computation, vol. 48, No. 177, Jan. 1987, pp. 243-264.

Hankerson, et al., "Guide to Elliptic Curve Cryptography", 2004 Springer-Verlag New York, Inc.

Blake, et al., "Advances in Elliptic Curve Cryptography", 2005 London Mathematical Society lecture note series, Cambridge University Press.

Menezes, "Elliptic Curve Public Key Cryptosystems", 1993 Kluwer Academic Publishers, pp. 16-19.

Yen, et la., "Side-Channel Security of Montgomery Ladder Revisited".

Itoh et al., Address-Bit Differential Power Analysis of Crytographic Schemes OK-ECDH and OK-ECDSA, CHES 2002, LNCS 2523, pp. 129-143, 2002 Springer-Verlag.

* cited by examiner

APPARATUS AND METHOD FOR CALCULATING A RESULT IN A SCALAR MULTIPLICATION

TECHNICAL FIELD

Embodiments of the invention relate to cryptography, and particularly to an apparatus and method for calculating a result of a scalar multiplication of a reference number with a reference point on an elliptic curve.

BACKGROUND

Side-channel attacks are a class of methods for crypto analysis. In contrast to classical attacks on cryptographic applications, an attacker here does not try to break the underlying abstract mathematical algorithm, but attacks a special implementation of a cryptographic algorithm. In this respect, the attacker uses easily accessible physical measurement variables of the concrete implementation, as for example run-time of the calculation, power consumption and electromagnetic radiation of the processor during the calculation or the behavior of the implementation with induced errors. The physical measurement values of an individual calculation may be analyzed directly (e.g. in a simple power analysis, SPA), or an attacker records measurement values of several calculations (for example using a storage oscilloscope) and evaluates the measurement values subsequently statistically (for example in a differential power analysis, DPA). Side-channel attacks are often substantially more efficient than classical crypto-analytical techniques and may even interfere with methods which are regarded as secure from the point of view of the algorithms when the implementation of this algorithm is not perfected against side-channel attacks. In particular for Smart Cards and embedded applications, countermeasures against side-channel attacks are necessary.

Modern cryptographic systems based on public-key cryptography use physical means, e.g. Smart Cards or dongles to securely store secret key material and to execute asymmetric crypto-operations like digital signatures or the exchange of keys. As a basis for asymmetric cryptography multiplicative groups or elliptic curves may serve. The latter have the advantage that with the same key length the security level is higher, since the best known algorithms for attacking multiplicative groups have sub-exponential running time while only attacks with exponential running time are known for elliptic curve cryptography.

An elliptic curve E is the set of solutions of a cubic equation $y^2+a_1xy+a_3y=x^3+a_2x^2+a_4x+a_6$ with coefficients in a finite field K, which has no singular points, i.e. no solutions (r,s) of the equation exist, so that the partial derivations for x and for y of the curve equation have a common zero in (r,s). The solutions to the elliptic curve E together with a point O at infinity as zero element form an additive abelian group whose group law may be interpreted geometrically. Of importance here are two results from algebraic geometry. Each straight line intersects an elliptic curve in three (not necessarily different) points and for two (not necessarily different) points a third point may be calculated, so that the sum of the three points is the neutral element O. Let P and Q be two points on E with P≠−Q and g the straight line through P and Q. (In case P=Q, the straight line is a tangent). This straight line intersects the elliptic curve in a third point R. By mirroring R at the x axis S=P+Q is obtained. The case of P=−Q may be briefly discussed. Then the inclination of a straight line g is infinite and the third intersection is the point O at infinity.

Analogously to the definition of the scalar multiplication in vector spaces, scalar multiplication on elliptic curves is defined. Let P be a point of the elliptic curve E and let k be an integer. The scalar multiplication k*P corresponds to a k-times addition of P to itself. This scalar multiplication forms the substantial element in crypto-systems based on elliptic curves. With cryptographically strong elliptic curves, the scalar multiplication represents a one-way function, i.e. it may be executed in polynomial time, but may only be inverted in exponential time. An efficient algorithmic reconstruction of the scalar thus is already unthinkable with moderate parameter length. With carefully selected cryptographic parameters in practice only unprotected implementations offer possibilities for an attack by analysis of side-channels.

Let $(b_{n-1}, \ldots, b_0)$ be the binary representation of a scalar k and let P be a point on an elliptic curve. The scalar multiplication Q=k*P may be calculated using the following simple (double-and-add) algorithm:
 1) Q←O
 2) for i←n−1 to 0 do
 3) Q←2*Q
 4) if $b_i$=1 then Q←Q+P
 5) end With a simple power analysis attack (SPA) the profile of the power consumption of the hardware during a single scalar multiplication k*P is evaluated. The algorithm of scalar multiplication substantially consists in additions and doublings of points on the elliptic curve. These operations are realized by several mathematical operations in the finite field K and are different, with naive implementation, regarding number and type of the executed operations. Thus, the profile of the power consumption of an addition is different to that of a doubling. These differences may already be made visible with respect to low-cost measurement devices and thus from the sequence of additions and doublings, the binary representation of a scalar may be reconstructed. The scalar here is normally the secret key of a cryptographic protocol to be protected.

With a differential power analysis (DPA) the profiles of the power consumption of the hardware are recorded during several scalar multiplications k*P at different possibly dependently selected inputs using a storage oscilloscope. Subsequently the measurement values are evaluated statistically. In such an attack, typically data locality of key information in cryptographic algorithm is used. The attacker sets up hypotheses over few key bits and tests the correctness of the hypothesis by a classification of the measurement curves and the application of statistical testing methods. The high relevance in danger of DPA on the one hand consists in the fact that the use of many measurement curves may amplify electrical effects which are hidden below the noise threshold of the measurement equipment in individual measurement curves to a level that even individual bits and individual switching operations and changes of states may become visible in the attacked hardware. On the other hand, the technical and financial hurdles for executing such a non-invasive attack are so low that already amateur electronics engineers may be possible attackers. Often only a few hundred measured power profiles are sufficient which may be gathered in a few minutes and a few minutes of calculation time of a script for statistical evaluation in order to attack implementations without suitable countermeasures against side-channel attacks and to completely extract the secret key material stored in the hardware.

A further variant relevant for practice of DPA are template attacks. In this class of attacks initially in a learning phase by means of DPA techniques, the relevant temporal parts of the power profile for the extraction of key data are determined.

Here, conventionally, the assumption is made that the attacker has the complete control over the system to be attacked during the learning phase and is in particular able to choose key data. In the second phase of attack key data is extracted from a device with unknown key using these relevant locations with the help of suitable software for post processing. As in the best case for an actual attack only one single profile of the power consumption may be necessary, template attacks may also be regarded as a special case of SPA.

A defense of SPA may be executed by force by adjusting the effort for each bit. This may, on the one hand, be done by an effort adjustment for addition and doubling or by adjusting the sequence of additions and doublings to E. In practice, frequently the second alternative is selected and the algorithm for scalar multiplication is reformulated accordingly.

1) $Q_0 \leftarrow O$
2) for $i \leftarrow n-1$ to 0 do
3) $Q_0 \leftarrow 2*Q_0$
4) $Q_1 \leftarrow Q_0 + P$
5) $Q_0 \leftarrow Q_{b\_i}$
6) end The result of scalar multiplication may be found in the variable $Q_0$. This algorithm results in the fact that the run-time drastically increases and now with each key bit an addition is executed, independent of whether the result of the addition is required for executing the scalar multiplication or not.

A further method for a defense against an SPA attack with respect to a scalar multiplication is represented by the so-called Montgomery Ladder.

Let $(b_{n-1}, \ldots, b_0)$ be the binary representation of a scalar $k$ and let P be a point on an elliptic curve. The Montgomery Ladder simultaneously calculates the x-coordinates of the points $k*P$ and $(k+1)*P$. As the x- and y-coordinate of the difference point of the two results are known, the complete point $k*P$ of the result may be reconstructed. The Montgomery algorithm is:

1) $R \leftarrow O$, $S \leftarrow P$
2) for $i \leftarrow n-1$ to 0 do
3) if $b_i = 1$ then $\{R \leftarrow R+S, S \leftarrow 2*S\}$
4) else $\{S \leftarrow S+R, R \leftarrow 2*R\}$
5) end
6) reconstruct $k*P$ from R, S and P The sequence of additions or doublings in step (3) or (4) is now independent of the key bits and completely uniform. Only different jumps in the if-then-else instruction and different addresses for the registers S and R depending on the actual key bit $b_i$ generate a variation in the power profile so that the value of the key bits may be computed using this side-channel information.

SUMMARY

According to an embodiment of an apparatus for calculating a result of a scalar multiplication of a reference number with a reference point on an elliptic curve, the apparatus includes a random number generator and a processor. The random number generator is configured to generate a random bit. The processor is configured to calculate the result of the scalar multiplication based on a calculation algorithm using a first auxiliary variable storing a first interim result representing an integer multiple of the reference point or a coordinate of an integer multiple of the reference point and a second auxiliary variable storing a second interim result representing another integer multiple of the reference point or a coordinate of another integer multiple of the reference point. Further, the processor is configured to swap a value stored by the first auxiliary variable and a value stored by the second auxiliary variable during the calculation of the result of the scalar multiplication, if a swap condition depending on the generated random bit and possibly further information is fulfilled. By swapping the interim results of the calculation of the scalar multiplication of the reference number with the reference point randomly, it is impossible or nearly impossible for an attacker to extract a reference number (which may represent a secret key of the cryptographic algorithm) by a simple current analysis, a first-order differential current analysis or a template attack.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. The features of the various illustrated embodiments can be combined unless they exclude each other. Embodiments are depicted in the drawings and are detailed in the description which follows.

DETAILED DESCRIPTION

In the following, the same reference numerals are partly used for objects and functional units having the same or similar functional properties and the description thereof with regard to a figure shall apply also to other figures in order to reduce redundancy in the description of the embodiments.

Figure 1:
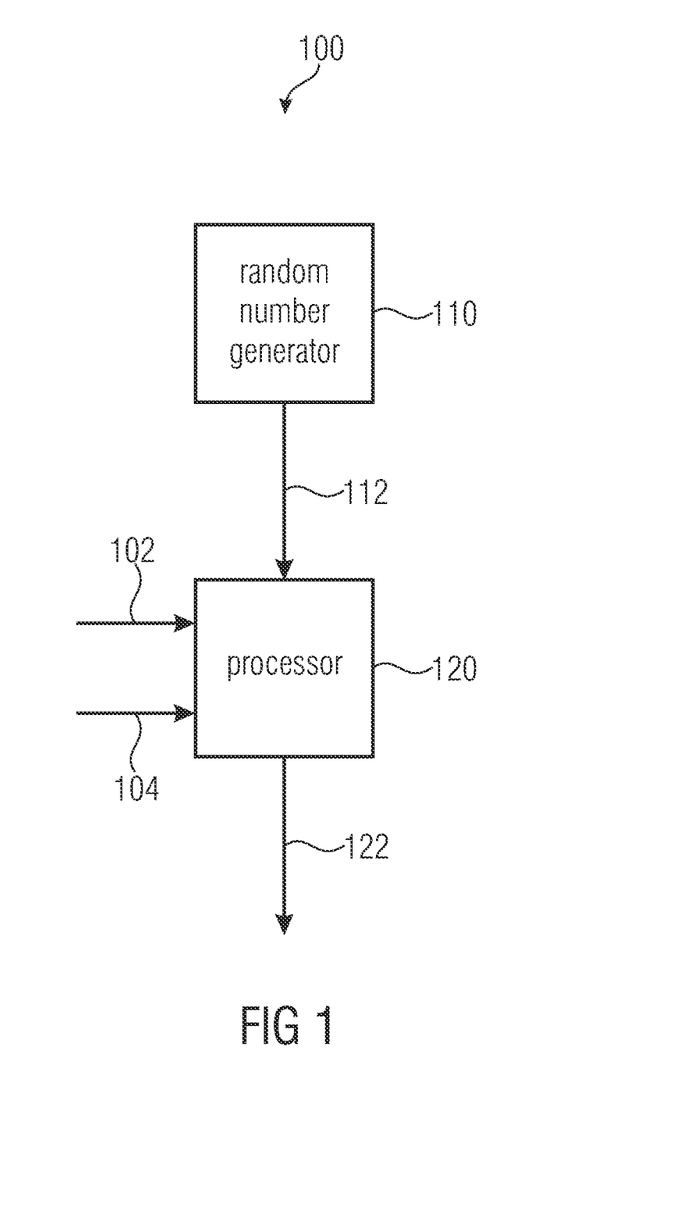
FIG. 1 is a block diagram of an apparatus for calculating a result of a scalar multiplication of a reference number with a reference point on an elliptic curve.

FIG. 1 shows a block diagram of an apparatus 100 for calculating a result 122 of a scalar multiplication of a reference number 102 with a reference point 104 of an elliptic curve according to an embodiment. The apparatus 100 comprises a random number generator 110 connected to a processor 120. The random number generator 110 generates a random bit 112. The processor 120 calculates the result 122 of the scalar multiplication based on a calculation algorithm using a first auxiliary variable storing a first interim result representing an integer multiple of the reference point 104 or a coordinate of an integer multiple of the reference point 104 and a second auxiliary variable storing a second interim result representing another integer multiple of the reference point 104 or a coordinate of another integer multiple of the reference point 104. Further, the processor 120 swaps a value stored by the first auxiliary variable and a value stored by the second auxiliary variable during the calculation of the result 122 of the scalar multiplication, if a swap condition depending on the generated random bit 112 and possibly further information is fulfilled.

By swapping the interim results of the scalar multiplication randomly, an asymmetric behavior of the calculation algorithm for the calculation of the interim results can be masked, so that an attacker may not be able to extract the reference number 102 (which may be the secret key of the cryptographic algorithm) by simple power analysis, a first-order differential power analysis or a template attack. Therefore, the calculation of the result 122 of the scalar multiplication of the reference number with the reference point on the elliptic curve (which may be the key operation of an elliptic curve cryptographic system) can be better protected against simple power analysis attacks, differential power analysis attacks and/or template attacks.

The random number generator 110 may be a true random number generator determining the random number, for example, based on freely running oscillators, on a property of a phase locked loop (PLL) or a bus traffic within the apparatus 100, or a pseudorandom number generator, for example, based on a linear or non-linear feedback shift register.

The random bit 112 may be equal to 0 or 1 (which may correspond electrically to a signal with a low level or a signal with a high level).

The reference number 102 may be an integer number in binary representation. For example, the reference number 102 may be the secret key of a cryptographic algorithm using elliptic curves. In this example, the number of bits of the reference number 102 (also called key length) may set a security level of the elliptic curve cryptographic algorithm (more bits provide higher security).

The reference point 104 on the elliptic curve and the elliptic curve may be predefined.

For example, for masking the asymmetry of a double and add algorithm, which may be used for the scalar multiplication, the calculation algorithm may calculate two interim results, which makes the calculation of the scalar multiplication more symmetric. The remaining asymmetry may be masked by swapping the interim results randomly according to the described concept.

For this, the first auxiliary variable is used to store a first interim result and the second auxiliary variable is used to store a second interim result. In this connection, the first auxiliary variable and the second auxiliary variable may represent a memory address, an address pointer or a register, where interim results (and also the end result) can be stored. More generally, the first auxiliary variable and the second auxiliary variable are variables for storing interim results (e.g., at predefined memory addresses). On the other hand, the first interim result and the second interim result are values obtained during the calculation of the result 122 of the scalar multiplication stored by the first auxiliary variable or the second auxiliary variable. These values can be swapped, so that the first auxiliary variable may also store the second interim result and the second auxiliary variable may also store the first interim result during the calculation of the result 122 of the scalar multiplication.

It may be sufficient to calculate only one coordinate of the point on the elliptic curve representing the result of the scalar multiplication. If required, the second coordinate may be reconstructed based on the two interim results and the reference point 104. In other words, the first interim result may represent after consideration of all bits of the reference number 102 (after calculating a scalar multiple of the reference number with a coordinate of the reference point) a first coordinate of the point on the elliptic curve representing the result of the scalar multiplication and the processor 120 may calculate a second coordinate of the point on the elliptic curve representing the result of the scalar multiplication based on the first interim result and the second interim result after consideration of all bits of the reference number 102 and based on the reference point 104.

The result 122 of the scalar multiplication may be calculated by considering successively one bit of the reference number 102 after the other (e.g., by a loop). In other words, the processor 120 may consider each bit of the reference number 102 for calculating the result 122 of the scalar multiplication successively in a loop.

For this, the random number generator 110 may generate a random bit 112 for each bit of the reference number 102 and the processor 120 may calculate a first interim result and a second interim result for each bit of the reference number 102 (depending on the interim results calculated for the preceding bits of the reference number). Since an individual random bit is generated for each bit of the reference number, the swap condition may be fulfilled in some cases (for some bits of the reference number) and not fulfilled in other cases (for other bits of the reference number). Therefore, the processor 120 may swap the values stored by the auxiliary variables randomly during the calculation of the result 122 of the scalar multiplication. More generally, the processor 120 may swap a value stored by the first auxiliary variable and a value stored by the second auxiliary variable before a (new) first interim result and a (new) second interim result is calculated for a bit of the reference number 102 to be considered next, if the swap condition is fulfilled for the random bit 112 generated for the bit of the reference number 102 to be considered next.

The swap condition can be predefined in various ways mainly depending on the used calculation algorithm. In one embodiment, the swap condition may depend directly on the random bit 112. In other words, the swap condition may be fulfilled, if the random bit 112 is equal to a predefined bit value. This predefined bit value may be 0 or 1 depending on the actual implementation (e.g. positive or negative logic). In this embodiment, for a more detailed possible implementation, the processor 120 may swap a value stored by the first auxiliary variable and a value stored by the second auxiliary variable before calculating a (new) first interim result and a (new) second interim result for a bit to be considered next and may swap the value stored by the first auxiliary variable and the value stored by the second auxiliary variable again after calculating the new first interim result (which is stored by the second auxiliary variable after calculation and stored by the first auxiliary variable after the repeated swapping) and the new second interim result (which is stored by the first auxiliary variable after calculation and stored by the second auxiliary variable after repeating the swapping), if the random bit 112 is equal to the predefined bit value. In other words, the currently stored interim results may be swapped randomly before the calculation of new interim results and may be swapped back after the calculation of the new interim results.

In another embodiment, for example, the swap condition may be fulfilled for a random bit 112 generated for a bit of the reference number 102 to be considered next, if the random bit 112 is unequal to a random bit 112 generated for a last already considered bit of the reference number 102. In other words, the swapping of the values stored by the first auxiliary variable and the second auxiliary variable may depend on a comparison of two random bits 112 generated for two (directly succeeding) bits of the reference number 102. In this way, a swap back, as described in the example before, may not be necessary, since the comparison of the random bits 112 may consider whether or not the value stored by the auxiliary variables are already swapped, so that the interim results are not mixed up for the further calculation, although the interim results are not swapped back after considering a bit of the reference number 102 (e.g. by carrying out one iteration of a loop).

The swapping of the values of the auxiliary variables can be implemented in different ways. In an embodiment, the processor 120 may swap a value stored by the first auxiliary variable and a value stored by the second auxiliary variable by overwriting the value stored by the first auxiliary variable with the value stored by the second auxiliary variable and by overwriting the value stored by the second auxiliary variable with the value stored by the first auxiliary variable. This may be done, for example, by a triangle exchange through an auxiliary register storing temporally the value stored by the first auxiliary variable or the second auxiliary variable.

In another embodiment, it may be sufficient to exchange the memory addresses of the auxiliary variables. In other words, the processor 120 may swap a value stored by the first auxiliary variable and a value stored by the second auxiliary variable by swapping a memory address or a memory address pointer of the first auxiliary variable and a memory address or a memory address pointer of the second auxiliary variable.

As already mentioned before, the result 122 of the scalar multiplication may be calculated by successively considering one bit of the reference number 102 after the other. Depending on the value (0 or 1) of each bit of the reference number, different calculation rules may be used for calculating interim results. In other words, the processor 120 may calculate an interim result to be stored by the first auxiliary variable and an interim result to be stored by the second auxiliary variable based on a first calculation rule of the calculation algorithm, if a bit of the reference number 102 (to be currently considered) is unequal to the random bit 112 (generated for the currently considered bit of the reference number), or based on a second calculation rule of the calculation algorithm, if the bit of the reference number 102 (to be currently considered) is equal to the random bit 112 (generated for the currently considered bit of the reference number).

In a different implementation the processor 120 may select the first or second calculation rule for the calculation of an interim result to be stored by the first auxiliary variable and an interim result to be stored by the second auxiliary variable based on the value of the random bit 112 (generated for the currently considered bit of the reference number 102), or based on a function of the random bit 112, of the currently considered bit of the reference number 102, and possibly of random bits and/or of bits of the reference number from previous iterations of the loop.

For example, the calculation algorithm may be a Montgomery Ladder algorithm. In this example, the processor 120 may calculate the interim result to be stored by the first auxiliary variable according to the first calculation rule by adding an interim result currently stored by the first auxiliary variable and an interim result currently stored by the second auxiliary variable and calculates the interim result to be stored by the second auxiliary variable according to the first calculation rule by doubling an interim result currently stored by the second auxiliary variable. Otherwise, the processor 120 may calculate the interim result to be stored by the first auxiliary variable according to the second calculation rule by doubling an interim result currently stored by the first auxiliary variable and calculates the interim result to be stored by the second auxiliary variable according to the second calculation rule by adding an interim result currently stored by the first auxiliary variable and an interim result currently stored by the second auxiliary variable.

In some embodiments, the first interim result and the second interim result may comprise a constant difference with respect to the addition of points on the elliptic curve. The first interim result may represent an integer multiple n*P of the reference point 104 or a coordinate of an integer multiple n*P of the reference point 104. The second interim result may represent an integer multiple (n+1)*P of the reference point 104 or a coordinate of an integer multiple (n+1)*P of the reference point 104.

In the following, embodiments are described in more detail. Although these embodiments show different aspects implemented together, these aspects may also be implemented independent from each other.

Described next is a technique to obtain good measures for protecting against SPA and to enable a very efficient method for protecting the scalar (reference number) against DPA and template attacks based thereon, for example.

An example for an actual implementation is shown in the following algorithm (Montgomery with SPA and DPA countermeasures for protection of the scalar), to simultaneously obtain protection against SPA of a Montgomery Ladder and against DPA of the intermediate results (stored by the auxiliary variables) R and S and against DPA and template attacks against the key bits (bits of the reference number):

```
1)   R←O, S←P            #initialisation of the first
                          auxiliary variable and the second
                          auxiliary variable
2)   randomize projective coordinate representation of R and S
3)   for i←n−1 to 0 do    #loop for successively considering each
                          bit b_i of the reference number
4)     generate random bit z
5)     if z=1 then {swap(R,S)}
6)     else {do not swap}
7)     if b_i XOR z=1 then {R←R+S, S←2*S}   #first calculation rule
8)     else {S←S+R, R←2*R}                   #second calculation rule
9)     if z=1 then {swap(R,S)}
10)    else {do not swap}
11)  end       #end of loop
12)  reconstruct k*P from R, S and P          #reconstructing second
                                               coordinate
```

In this embodiment, R is a first auxiliary variable, S is a second auxiliary variable, O is the neutral element of the elliptic curve, P is the reference point on the elliptic curve, k is the reference number, i is the counter variable, n is a number of bits of the reference number, z is the random bit and $b_i$ is a bit of the reference number.

In the shown algorithm, the first auxiliary variable R is initialized with the neutral element O of the elliptic curve or with a coordinate of the neutral element O of the elliptic curve and the second auxiliary variable S is initialized with the reference point on the elliptic curve P or with a coordinate of the reference point on the elliptic curve P. Then the first auxiliary variable R and the second auxiliary variable S can optionally be transformed to a randomized projective coordinate representation. Afterward for each bit $b_i$ of the reference number, the program statements of a loop are executed. In this loop a random bit z is generated and depending on the value of the random bit (swap condition) the values stored by the first auxiliary variable R and the second auxiliary variable S are swapped (e.g. if the random bit is equal to 1). Then, depending on a comparison of the currently considered bit $b_i$ of the reference number and the value of the random bit, a first calculation rule or a second calculation rule is used for calculating new interim results. Afterward the values stored by the first auxiliary variable R and the second auxiliary variable S are swapped back, if they were swapped before. After running the program statements of the loop one time for each bit $b_i$ of the reference number, the point on the elliptic curve k*P representing the result of the scalar multiplication can be reconstructed based on the interim results stored by the first auxiliary variable R and the second auxiliary variable S and based on the reference point on the elliptic curve P.

This example uses the Montgomery Ladder and data dependent exchange operations, which become possible due to the inherent symmetry of a Montgomery Ladder. The correctness of the shown algorithm may easily be verified if the two possible cases z=0 or z=1 are separately considered for the random bit z. In case z=1, the actually used value of the key bit $b_i$ (bit of the reference number) is negated by the XOR operation with z. As, however, in this case simultaneously also the intermediate results (stored by the first auxiliary variable) R and (stored by the second auxiliary variable) S before and after the program statements of the loop of the algorithm are exchanged, the algorithm calculates the correct results of the scalar multiplication.

Due to the fact that in every path of the loop an independent bit z selected with an equal distribution is used, the implementation of the then and else branches of the exchange operations in steps 5, 6, 9, 10 and the branches of the Montgomery Ladder in steps 7, 8 are not correlated anymore with the actual value of the bit $b_i$ of the secret scalar k. The values which decide which branches of the if-then-else instruction are passed are random with every execution of the algorithm. The analog conclusion applies for the resulting power profiles. Thus, these calculation steps of the algorithms are protected against a first-order DPA.

One decisive step of the technologies of the described concept may be the use of the inherent symmetry of the Montgomery Ladder algorithm for a scalar multiplication of points on elliptic curves to eliminate the correlation between bits of the scalar (which normally represents the secret key of a cryptographic protocol) and the branches of execution of the algorithm (program). This way, an efficient and secure method for scalar blinding may be implemented which may protect the bits of the scalar against DPA and thus makes the learning phase during a template attack substantially more difficult or even prevents the same.

The described proceedings offer several advantages, for example. The described concept for implementing a scalar blinding, compared to classical approaches, may require no arithmetic to be able to execute calculations over the integers modulo the order o of a subgroup generated by the reference point. For example, in particular with low-cost applications based on methods with elliptic curves over finite fields of characteristic 2, no arithmetic has to be implemented over the integers. Thus, the arithmetic in such cases of application may be realized in a very space efficient way in hardware. Further, no storage space has to be provided to store the order o of a subgroup of the point group. No mechanism has to be provided to protect the value o against manipulations by an attacker or to at least be able to detect such changes. Additionally, no increase of the size of the scalar k as in the transformation into k'=k+r*o may take place by the multiplication r*o during the blinding operation with a random integer r. In particular, the registers for executing the scalar multiplication may not have to be elongated. Thus, the performance of the inventive method may be better. Further, the step for a transformation of the scalar may itself again be the target of side-channel attacks of a different kind. In the classical technology for scalar blinding using the order o of a subgroup this step is a relatively time-consuming calculation in which many intermediate results occur. Each generated bit may in principal again serve as a target for a different side-channel attack to the scalar. Thus, in the implementation of this transformation it has to be considered thoroughly not to open a new security vulnerability when protecting the implementation. In the described concept, the transformation step may only consist in the calculation of an XOR operation in step 7 of the algorithm above. This calculation is very simple and may only use the least possible amount of data. Further, no further intermediate results may occur. Thus, in the practical implementation of the described concept it ought to be easier to protect this transformation step than with classical approaches.

In the following, a variant of the algorithm above for implementing the proposed concept is described, which may save the step of exchanging (swapping) per iteration of the main loop and is thus more efficient than the already described algorithm:

```
1)   R←O, S←P          #initialisation of the first auxiliary variable
                        and the second auxiliary variable
2)   randomize projective coordinate representation of R and S
3)   z0←0
4)   for i←n−1 to 0 do  #loop for successively considering each
                         bit b_i of the reference number
5)   generate random bit z1
6)   if z0 XOR z1=1 then {swap(R,S)}
7)   else {do not swap}
8)   if b_i XOR z1=1 then {R←R+S, S←2*S}   #first calculation rule
9)   else {S←S+R, R←2*R}                    #second calculation rule
10)  z0←z1
11)  end    #end of loop
12)  if z0=1 then {swap(R,S)}
13)  else {do not swap}
14)  reconstruct k*P from R, S and P   #reconstructing second
                                        coordinate
```

In this embodiment, R is a first auxiliary variable, S is a second auxiliary variable, O is the neutral element of the elliptic curve, P is the reference point on the elliptic curve, k is the reference number, i is the counter variable, n is a number of bits of the reference number, $b_i$ is a bit of the reference number, z1 is a random bit generated for (or during) the consideration of the bit $b_i$ of the reference number (to be considered next) and z0 is a random bit generated for (or during) the consideration of a last already considered bit $b_{i-1}$ of the reference number.

In the shown algorithm, the first auxiliary variable R is initialized with the neutral element O of the elliptic curve or with a coordinate of the neutral element O of the elliptic curve and the second auxiliary variable S is initialized with the reference point on the elliptic curve P or with a coordinate of the reference point on the elliptic curve P. Then the first auxiliary variable R and the second auxiliary variable S can optionally be transformed to a randomized projective coordinate representation. Afterward for each bit $b_i$ of the reference number, the program statements of a loop are executed. In this loop a random bit z1 is generated and depending on a comparison of the value of the random bit z1 generated for the bit $b_i$ of the reference number and the value of the random bit z0 generated for a last already considered bit $b_{i-1}$ of the reference number, the values stored by the first auxiliary variable R and the second auxiliary variable S are swapped (e.g. if the values of the random bits are not equal). Then, depending on a comparison of the currently considered bit $b_i$ of the reference number and the value of the random bit z1, a first calculation rule or a second calculation rule is used for calculating new interim results. Afterward the value of the random bit z0 is set to the value of the random bit z1. After running the program statements of the loop one time for each bit $b_i$ of the reference number and a final swapping dependent on the value of z0, the point on the elliptic curve k*P representing the result of the scalar multiplication can be reconstructed based on the interim results stored by the first auxiliary variable R and the second auxiliary variable S and based on the reference point on the elliptic curve P.

This may represent a Montgomery Ladder algorithm with SPA and DPA countermeasures for protecting the scalar, for example.

The difference between the two algorithms described in the embodiments above is that the respectively directly subsequent exchange step (swapping of values stored by the auxiliary variables) between two iterations of a main loop are now summarized into one single step of operation. The correctness of the algorithm may thus be concluded analogously to the proceeding described before. As apart from that in every iteration of the main loop a new random bit z1 generated independently and equally distributed is used, also the considerations for the correlation of the then and else branches of the respective bits of the scalar maintain their validity. Thus, the variant of the described concept in this algorithm also offers protection against first-order DPA attacks on the bits of the scalar.

In the following, another variant of the algorithm above for implementing the proposed concept is described:

```
1)  R←O, S←P         #initialisation of the first auxiliary variable and
                      the second auxiliary variable
2)  randomize projective coordinate representation of R and S
3)  for i←n−1 to 0 do  #loop for successively considering each bit b_i
                       of the reference number
4)  generate random bit z
5)  if b_i XOR z=1 then {swap(R,S)}
6)  else {do not swap}
7)  if z=1 then {R←R+S, S←2*S}   #first calculation rule
8)  else {S←S+R, R←2*R}          #second calculation rule
9)  if b_i XOR z=1 then {swap(R,S)}
10) else {do not swap}
11) end                           #end of loop
12) reconstruct k*P from R, S and P   #reconstructing second coordinate
```

In this embodiment, R is a first auxiliary variable, S is a second auxiliary variable, O is the neutral element of the elliptic curve, P is the reference point on the elliptic curve, k is the reference number, i is the counter variable, n is a number of bits of the reference number, z is the random bit and $b_i$ is a bit of the reference number.

In the shown algorithm, the first auxiliary variable R is initialized with the neutral element O of the elliptic curve or with a coordinate of the neutral element O of the elliptic curve and the second auxiliary variable S is initialized with the reference point on the elliptic curve P or with a coordinate of the reference point on the elliptic curve P. Then the first auxiliary variable R and the second auxiliary variable S can optionally be transformed to a randomized projective coordinate representation. Afterward for each bit $b_i$ of the reference number, the program statements of a loop are executed. In this loop a random bit z is generated and depending on a comparison of the currently considered bit $b_i$ of the reference number and the value of the random bit (swap condition) the values stored by the first auxiliary variable R and the second auxiliary variable S are swapped (e.g. if the random bit z is not equal to the currently considered bit $b_i$ of the reference number). Then, depending on the value of the random bit, a first calculation rule or a second calculation rule is used for calculating new interim results. Afterward the values stored by the first auxiliary variable R and the second auxiliary variable S are swapped back, if they were swapped before. After running the program statements of the loop one time for each bit $b_i$ of the reference number, the point on the elliptic curve k*P representing the result of the scalar multiplication can be reconstructed based on the interim results stored by the first auxiliary variable R and the second auxiliary variable S and based on the reference point on the elliptic curve P.

In the following, another variant of the algorithm above for implementing the proposed concept is described, which may save one step of exchanging (swapping) per iteration of the main loop and is thus a bit more efficient than the previously described algorithm:

```
1)  R←O, S←P         #initialisation of the first auxiliary variable and
                      the second auxiliary variable
2)  randomize projective coordinate representation of R and S
3)  z0←0
4)  for i←n−1 to 0 do  #loop for successively considering each bit b_i
                       of the reference number
5)  generate random bit w
6)  z1← b_i XOR w
7)  if z0 XOR z1=1 then {swap(R,S)}
8)  else {do not swap}
9)  if w=1 then {R←R+S, S←2*S}   #first calculation rule
10) else {S←S+R, R←2*R}          #second calculation rule
11) z0←z1
12) end#end of loop
13) if z0=1 then {swap(R,S)}
14) else {do not swap}
15) reconstruct k*P from R, S and P   #reconstructing second coordinate
```

In this embodiment, R is a first auxiliary variable, S is a second auxiliary variable, O is the neutral element of the elliptic curve, P is the reference point on the elliptic curve, k is the reference number, i is the counter variable, n is a number of bits of the reference number, $b_i$ is a bit of the reference number, w is a random bit, and z0 and z1 are auxiliary variables.

In the shown algorithm, the first auxiliary variable R is initialized with the neutral element O of the elliptic curve or with a coordinate of the neutral element O of the elliptic curve and the second auxiliary variable S is initialized with the reference point on the elliptic curve P or with a coordinate of the reference point on the elliptic curve P. Then the first auxiliary variable R and the second auxiliary variable S can optionally be transformed to a randomized projective coordinate representation. Afterward for each bit $b_i$ of the reference number, the program statements of a loop are executed. In this loop a random bit w is generated and the value z1 is computed as the XOR of the random bit w and the currently considered bit $b_i$ of the reference number. Depending on a comparison of the value z1 and the value z0 generated for a last already considered bit $b_{i-1}$ of the reference number, the values stored by the first auxiliary variable R and the second auxiliary variable S are swapped (e.g. if the value of the auxiliary variable z1 is not equal to the value of the auxiliary variable z0). Then, depending on the value of the random bit w generated for the currently considered bit $b_i$ of the reference number, a first calculation rule or a second calculation rule is used for calculating new interim results. Afterward the value of the bit z0 is set to the value of the bit z1. After running the program statements of the loop one time for each bit $b_i$ of the reference number and a final swapping dependent on the value of z0, the point on the elliptic curve k*P representing the result of the scalar multiplication can be reconstructed based on the interim results stored by the first auxiliary variable R and the second auxiliary variable S and based on the reference point on the elliptic curve P.

This may represent a Montgomery Ladder algorithm with SPA and DPA countermeasures for protecting the scalar, for example.

The proposed concept describes a simplified and effective method for a defense against certain DPA and template attacks during a scalar multiplication, for example.

In some embodiments, the y-coordinate (of the reference point and the interim results) is omitted in the calculation (of the result of the scalar multiplication) so that a number of necessary registers and storage amounts may be reduced. Thus, for example, the Montgomery Ladder is especially relevant for use in embedded systems (e.g., Smart Cards) as resources here usually are very limited.

By using the described concept, an SPA countermeasure providing an implementation of the if-then-else instruction indistinguishable by side-channel measurements may be realized. A basic technology may be to use a symmetry when executing the Montgomery Ladder. It may be possible to unify the two branches of execution of the Montgomery Ladder in the then and else branches while exchanging or not exchanging at the beginning and/or the end of the for loop the two intermediate results (stored by) R and S depending on random bits and/or on key bits (bits of the reference number). It also may be possible to unify the two branches of execution of the Montgomery Ladder in the then and else branches while calculating new interim results (stored by) R and S depending on random bits and/or on key bits (bits of the reference number).

By using the described concept, a method offering scalar blinding and countermeasure against DPA of bits of the scalar may be realized.

For defending against the DPA a randomized projective representation of the points of the elliptic curve may be used. It is possible by such a measure to prevent a first-order DPA to bits of the intermediate results in (the first auxiliary variable and the second auxiliary variable) R and S calculated during the scalar multiplication.

Further, the described concept may provide a possibility to defend against template attacks. In the learning phase of a template attack the attacker identifies the locations in the power profile where the key bits are processed. In the attacking phase it is then possible to extract the actual key bits with the help of the identified locations from one or several measurements. In one variant of these template attacks the different rounds of scalar multiplication may be compared relative to each other. This so-called Big-Mac attack makes the results of the learning phase additionally independent of an individual implementation which is attacked. Accepting only few remaining possibilities for the unknown part of the key space which may be tested quickly in exhaustive search, the attack is substantially more robust against adapting the template from one implementation to another. These template attacks may be prevented by using the described concept.

This also has the advantage in comparison to common scalar blinding techniques that the process time and the memory requirement are reduced (since the scalar may not be enlarged during the randomization). Further, according to the described concept, in some embodiments only calculation steps in finite fields $GF(2^n)$ may be necessary, so that the effort regarding circuit technology can be kept low in hardware implementations.

Some embodiments relate to a method and an apparatus for DPA-resistant calculation of the Montgomery Ladder.

Some embodiments relate to an apparatus for calculating a result of a scalar multiplication of a reference number with a reference point comprising a means for generating a random number (e.g. a random number generator) and a means for calculating the result of the scalar multiplication (e.g. a processor). The means for generating a random number generates a random bit. The means for calculating the result of the scalar multiplication calculates the result of the scalar multiplication based on a calculation algorithm using a first auxiliary variable storing the first interim result representing an integer multiple of the reference point or a coordinate of an integer multiple of a reference point and a second auxiliary variable storing a second interim result representing another integer multiple of the reference point or a coordinate of another integer multiple of the reference point. Further, the means for calculating the result of the scalar multiplication swaps a value stored by the first auxiliary variable and a value stored by the second auxiliary variable during the calculation of the result of the scalar multiplication, if the swap condition depending on the generated random bit and possibly further information is fulfilled.

Further, the apparatus may realize additional optional features mentioned above.

Figure 2:
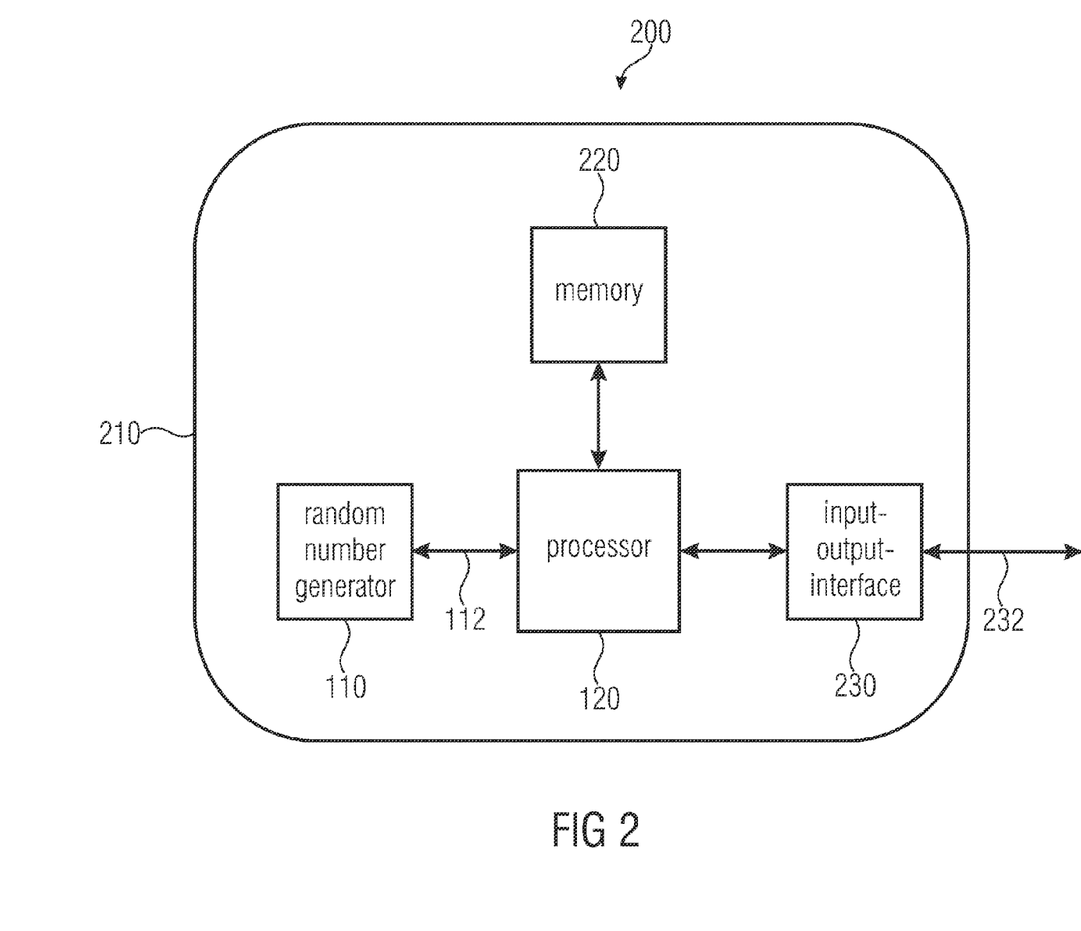
FIG. 2 is a block diagram of a cryptographic system.

FIG. 2 shows a block diagram of a cryptographic system 200 with an apparatus for calculating a result of a scalar multiplication of a reference number with a reference point on an elliptic curve according to the described concept as an embodiment. The cryptographic system 200 comprises a random number generator 110 connected to a processor 120 as described above. Further, the cryptographic system 200 comprises a memory 220 connected to the processor 120 and an input-output interface 230 also connected to the processor 120. The memory 220 may store, for example, the reference number, the reference point on the elliptic curve and/or parameters of the elliptic curve. Further, the memory 220 may comprise memory space assigned to the first auxiliary variable and the second auxiliary variable for storing interim results. The input-output interface 230 may provide output data 232 to outside and/or input data 232 from outside to the processor 120 and may be a wireless and/or a wireline/wired interface.

The random number generator 110 may be a true random number generator determining the random number, for example, based on freely running oscillators, on a property of a phase locked loop (PLL) or a bus traffic within the cryptographic system 200, or a pseudorandom number generator, for example, based on a linear or non-linear feedback shift register.

The cryptographic system 200 may be implemented, for example, in a smart card 210, a chip card or a computer.

Figure 3:
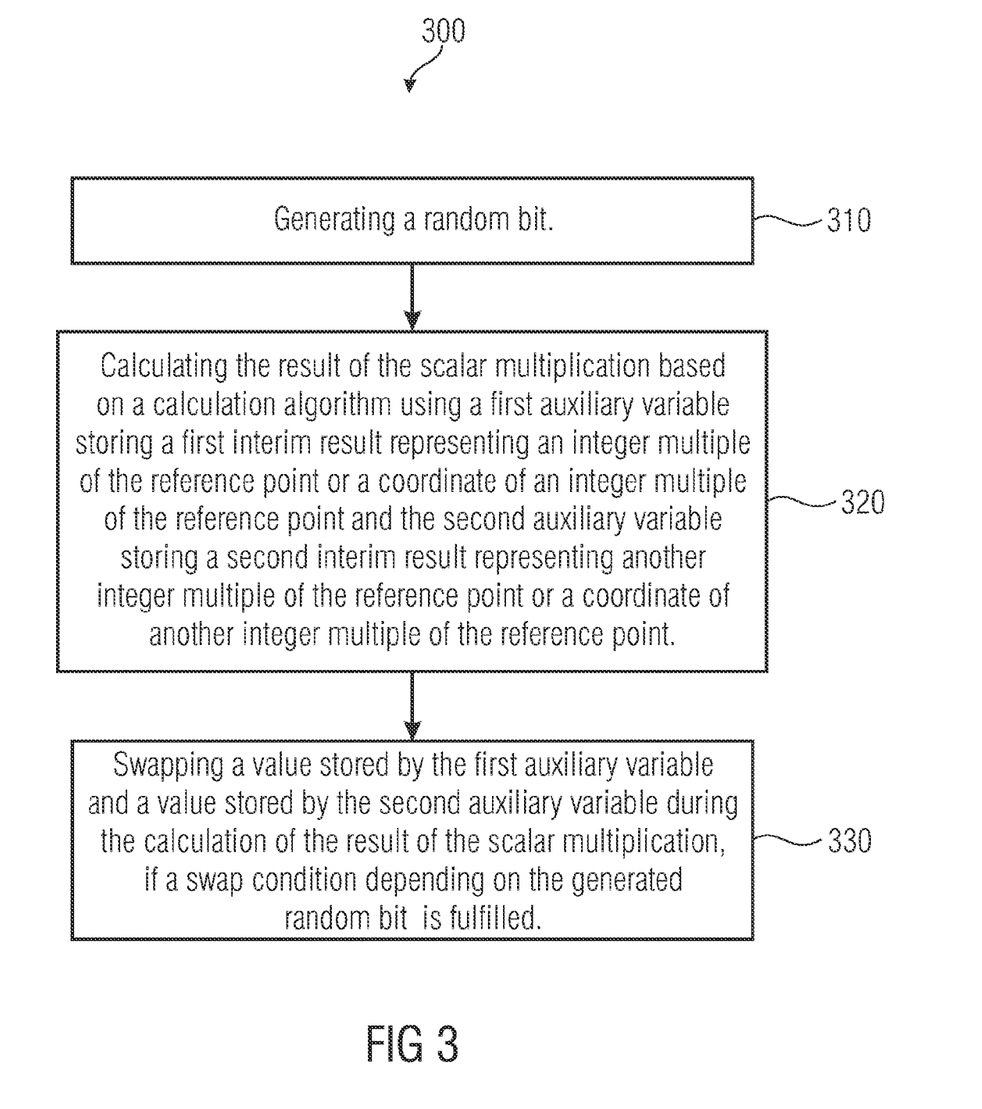
FIG. 3 is a flow chart of a method for calculating a result of a scalar multiplication of a reference number with a reference point on an elliptic curve.

FIG. 3 shows a flow chart of a method 300 for calculating a result of a scalar multiplication of a reference number with a reference point on an elliptic curve according to an embodiment. The method 300 comprises generating a random bit (Step 310) and calculating the result of the scalar multiplication based on a calculation algorithm using a first auxiliary variable storing a first interim result representing an integer multiple of the reference point or a coordinate of an integer multiple of the reference point and a second auxiliary variable storing a second interim result representing another integer multiple of the reference point or a coordinate of another integer multiple of the reference point (Step 320). Further, the method 300 comprises swapping a value stored by the first auxiliary variable and a value stored by the second auxiliary variable during the calculation of the result of the scalar multiplication, if a swap condition depending on the generated random bit and possibly further information is fulfilled (Step 330).

Additionally, the method 300 may comprise further optional steps representing one or more of the aspects of the proposed concept mentioned above.

In general, a before described random number generator, a processor, a memory, an input-output interface, a means for generating a random number and/or a means for calculating the result of a scalar multiplication may be an independent hardware unit or a part of a computer or a microcontroller as well as a computer program or a software product for running on a computer or a microcontroller.

Although some aspects of the described concept have been described in the context of an apparatus, these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, the embodiments described herein can be implemented in hardware and/or software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable medium e.g. as described above.

Other embodiments comprise the computer program for performing one of the methods described herein, stored on a machine readable medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

Terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An apparatus for calculating a result of a scalar multiplication of a reference number with a reference point on an elliptic curve, comprising:

a random number generator comprising electric circuitry and configured to generate random bits; and a processor configured to calculate the result of the scalar multiplication based on a Montgomery ladder algorithm involving a loop over every bit of the reference number, the processor comprising a first auxiliary variable storing a first interim result representing an integer multiple of the reference point or a coordinate of an integer multiple of the reference point and a second auxiliary variable storing a second interim result representing another integer multiple of the reference point or a coordinate of another integer multiple of the reference point, wherein the processor is configured to, per loop i of the Montgomery ladder algorithm, swap a value stored by the first auxiliary variable and a value stored by the second auxiliary variable, if a swap condition is fulfilled, and controlled via a computation condition which at least depends on an $i^{th}$ bit of the reference number, and if the computation condition is fulfilled, perform an addition of the values stored in the first and second auxiliary variable registers and perform a duplication of the value stored in the second auxiliary variable register, and update the first auxiliary variable with a sum of the addition and the second auxiliary variable with a result of the duplication, and if the computation condition is not fulfilled, perform an addition of the values stored in the first and second auxiliary variable registers and perform a duplication of the value stored it the first auxiliary variable register, and update the second auxiliary variable with a sum of the addition and the first auxiliary variable with a result of the duplication, wherein at least one of the swap condition and the calculation condition depends on the $i^{th}$ bit of the reference number, and the swap condition depends directly on at least one bit of the generated random bits and the calculation condition depends on at least one bit of the generated random bits respectively, and wherein a result of scalar multiplication is determinable from values stored by the first and second auxiliary variables after the loop over every bit of the reference number.

2. The apparatus according to claim 1, wherein the processor is configured such that the swap condition and the calculation condition within loop i respectively depend on a random bit $z_i$ of the generated random bits.

3. The apparatus according to claim 2, wherein the swap condition depends on the random bit $z_i$ and on the $i^{th}$ bit of the reference number and on at least one of random bit $z_{j<i}$ of a previous loop j and the $i^{th}$ bit of the reference number.

4. The apparatus according to claim 2,
wherein the swap condition is fulfilled if $z_i$ is equal to random bit $z_{j<i}$ of a previous loop j.

5. Apparatus according to claim 2, wherein the swap condition is fulfilled if the random bit $z_i$ is equal to a predefined bit value.

6. The apparatus according to claim 2, wherein the calculation condition is fulfilled either if the $i^{th}$ bit of the reference number is unequal to the random bit $z_i$, or if the $i^{th}$ bit of the reference number is equal to the random bit $z_i$.

7. The apparatus according to claim 2, wherein the calculation condition is fulfilled either if the random bit $z_i$ is equal to a predefined bit value, or if the random bit $z_i$ is unequal to a predefined bit value.

8. The apparatus according to claim 2, wherein the calculation condition depends on both the random bit $z_i$ and the $i^{th}$ bit of the reference number.

9. The apparatus according to claim 2, wherein the swap condition depends on the random bit $z_i$ and on the $i^{th}$ bit of the reference number.

10. The apparatus according to claim 1,
wherein the processor is configured to perform, in each loop i of the Montgomery ladder algorithm, the swapping before the performance and update controlled via the computation condition.

11. The apparatus according to claim 1,
wherein the processor is configured to, in each loop i of the Montgomery ladder algorithm, perform the swapping before the performance and update controlled via the computation condition and then, after the performance and update controlled via the computation condition, swap a value stored by the first auxiliary variable and a value stored by the second auxiliary variable again, if a further swap condition is fulfilled, wherein the swap condition, the calculation condition and the further swap condition depend on at least one bit of the generated random bits, respectively.

12. The apparatus according to claim 1, wherein the first interim result represents after consideration of all bits of the reference number a first coordinate of a point on the elliptic curve representing the result of the scalar multiplication, and wherein the processor is configured to calculate a second coordinate of the point on the elliptic curve representing the result of the scalar multiplication based on the first interim result and the second interim result after consideration of all bits of the reference number.

13. The apparatus according to claim 1, wherein the processor is configured to perform the swapping a value stored by the first auxiliary variable and a value stored by the second auxiliary variable by overwriting a first register containing the values stored by the first auxiliary variable with the values stored by the second auxiliary variable and by overwriting a second register containing the values stored by the second auxiliary variable with the values stored by the first auxiliary variable.

14. The apparatus according to claim 1, wherein the processor is configured to perform the swapping a value stored by the first auxiliary variable and a value stored by the second auxiliary variable by swapping a memory address or a memory address pointer pointing to a first memory location of the first auxiliary variable and a memory address or a memory address pointer pointing to a first memory location of the second auxiliary variable.

15. The apparatus according to claim 1, wherein a difference between the integer multiple of the reference point or the coordinate of an integer multiple of the reference point being represented by the first interim result and the other integer multiple of the reference point or the coordinate of the other integer multiple of the reference point being represented by the second interim result is a constant.

16. The apparatus according to claim 15, wherein the constant difference between the integer multiples of the reference point or coordinates of the integer multiples of the reference point represented by the first interim result and the second interim result is the reference point.

17. The apparatus according to claim 1, wherein the processor is configured to swap a value stored by the first auxiliary variable and a value stored by the second auxiliary variable before calculating a new first interim result and a new second interim result for a bit to be considered next and to swap the value stored by the first auxiliary variable and the value stored by the second auxiliary variable again after calculating the new first interim result, which is stored by the second auxiliary variable after calculation and stored by the first auxiliary variable after the repeated swapping and the new second interim result, which is stored by the first auxiliary variable after calculation and stored by the second auxiliary variable after repeating the swapping.

18. A cryptographic system including an apparatus for calculating a result of a scalar multiplication of a reference number with a reference point on an elliptic curve, the apparatus comprising:
a random number generator comprising electric circuitry and configured to generate random bits; and
a processor configured to calculate the result of the scalar multiplication based on a Montgomery ladder algorithm involving a loop over every bit of the reference number, the processor comprising a first auxiliary variable storing a first interim result representing an integer multiple of the reference point or a coordinate of an integer multiple of the reference point and a second auxiliary variable storing a second interim result representing another integer multiple of the reference point or a coordinate of another integer multiple of the reference point,
wherein the processor is configured to, per loop i of the Montgomery ladder algorithm, swap a value stored by the first auxiliary variable and a value stored by the second auxiliary variable, if a swap condition is fulfilled, and controlled via a computation condition which at least depends on an $i^{th}$ bit of the reference number, and
if the computation condition is fulfilled, perform an addition of the values stored in the first and second auxiliary variable registers and perform a duplication of the value stored in the second auxiliary variable register, and update the first auxiliary variable with a sum of the addition and the second auxiliary variable with a result of the duplication, and
if the computation condition is not fulfilled, perform an addition of the values stored in the first and second auxiliary variable registers and perform a duplication of the value stored in the first auxiliary variable register, and update the second auxiliary variable with a sum of the addition and the first auxiliary variable with a result of the duplication,
wherein at least one of the swap condition and the calculation condition depends on the $i^{th}$ bit of the reference number, and the swap condition depends directly on at least one bit of the generated random bits and the calculation condition depends on at least one bit of the generated random bits respectively, and
wherein a result of scalar multiplication is determinable from values stored by the first and second auxiliary variables after the loop over every bit of the reference number.

19. The cryptographic system according to claim 18, wherein the cryptographic system is a smart card.

20. An apparatus for calculating a result of a scalar multiplication of a reference number with reference point on an elliptic curve, comprising:
   a means for generating a random number configured to generate random bits; and
   a means for calculating the result of a scalar multiplication configured to calculating the result of the scalar multiplication based on a Montgomery ladder algorithm involving a loop over every bit of the reference number, the processor comprising a first auxiliary variable storing a first interim result representing an integer multiple of the reference point or a coordinate of an integer multiple of the reference point and a second auxiliary variable storing a second interim result representing another integer multiple of the reference point or the coordinate of another integer multiple of the reference point,
   wherein the means for calculating the result of the scalar multiplication is configured to, per loop i of the Montgomery ladder algorithm, swap a value stored by the first auxiliary variable and a value stored by the second auxiliary variable, if a swap condition is fulfilled, and controlled via a computation condition which at least depends on an $i^{th}$ bit of the reference number,
      if the computation condition is fulfilled, perform an addition of the values stored in the first and second auxiliary variable registers and perform a duplication of the value stored in the second auxiliary variable register, and update the first auxiliary variable with a sum of the addition and the second auxiliary variable with a result of the duplication, and
      if the computation condition is not fulfilled, perform an addition of the values stored in the first and second auxiliary variable registers and perform a duplication of the value stored in the first auxiliary variable register, and update the second auxiliary variable with a sum of the addition and the first auxiliary variable with a result of the duplication,
   wherein at least one of the swap condition and the calculation condition depends on the $i^{th}$ bit of the reference number, and the swap condition depends directly on at least one bit of the generated random bits and the calculation condition depends on at least one bit of the generated random bits respectively, and
   wherein a result of scalar multiplication is determinable from values stored by the first and second auxiliary variables after the loop over every bit of the reference number.

21. Method for calculating a result of a scalar multiplication of a reference number with a reference point on an elliptic curve, comprising:
   generating random bits;
   calculating the result of the scalar multiplication based on a Montgomery ladder algorithm involving a loop over every bit of the reference number, wherein a first auxiliary variable stores a first interim result representing an integer multiple of the reference point or a coordinate of an integer multiple of the reference point and a second auxiliary variable stores a second interim result representing another integer multiple of the reference point or a coordinate of another integer multiple of the reference point;
   per loop i of the Montgomery ladder algorithm, swapping a value stored by the first auxiliary variable and a value stored by the second auxiliary variable, if a swap condition is fulfilled, and controlled via a computation condition which at least depends on an $i^{th}$ bit of the reference number;
   if the computation condition is fulfilled, performing an addition of the values stored in the first and second auxiliary variable registers and perform a duplication of the value stored in the second auxiliary variable register, and update the first auxiliary variable with a sum of the addition and the second auxiliary variable with a result of the duplication; and
   if the computation condition is not fulfilled, performing an addition of the values stored in the first and second auxiliary variable registers and perform a duplication of the value stored in the first auxiliary variable register, and update the second auxiliary variable with a sum of the addition and the first auxiliary variable with a result of the duplication,
   wherein at least one of the swap condition and the calculation condition depends on the $i^{th}$ bit of the reference number, and the swap condition depends directly on at least one bit of the generated random bits and the calculation condition depends on at least one bit of the generated random bits, and
   wherein a result of scalar multiplication is determinable from values stored by the first and second auxiliary variables after the loop over every bit of the reference number.

22. A non-transitory computer readable medium storing a computer program configured to calculate a result of a scalar multiplication of a reference number with a reference point on an elliptic curve, the computer program comprising:
   program instructions to generate random bits;
   program instructions to calculate the result of the scalar multiplication based on a Montgomery ladder algorithm involving a loop over every bit of the reference number, wherein a first auxiliary variable stores a first interim result representing an integer multiple of the reference point or a coordinate of an integer multiple of the reference point and a second auxiliary variable stores a second interim result representing another integer multiple of the reference point or a coordinate of another integer multiple of the reference point;
   program instructions to, per loop i of the Montgomery ladder algorithm, swap a value stored by the first auxiliary variable and a value stored by the second auxiliary variable, if a swap condition is fulfilled, and controlled via a computation condition which at least depends on an $i^{th}$ bit of the reference number;
   if the computation condition is fulfilled, program instructions to perform an addition of the values stored in the first and second auxiliary variable registers and perform a duplication of the value stored in the second auxiliary variable register, and update the first auxiliary variable with a sum of the addition and the second auxiliary variable with a result of the duplication; and
   if the computation condition is not fulfilled, program instructions to perform an addition of the values stored in the first and second auxiliary variable registers and perform a duplication of the value stored in the first auxiliary variable register, and update the second auxiliary variable with a sum of the addition and the first auxiliary variable with a result of the duplication, wherein at least one of the swap condition and the calculation condition depends on the $i^{th}$ bit of the reference number, and the swap condition depends directly on at least one bit of the generated random bits and the calculation condition depends on at least one bit of the generated random bits respectively, and wherein a result of scalar multiplication is determinable from values stored by the first and second auxiliary variables after the loop over every bit of the reference number.

* * * * *